US009017553B2

(12) United States Patent
Mason

(10) Patent No.: US 9,017,553 B2
(45) Date of Patent: Apr. 28, 2015

(54) FILTRATION OF A HYDROCARBON FROM A FLUID

(76) Inventor: Craig A. Mason, Corona, CA (US)

( * ) Notice: Subject to any disclaimer, the term of this patent is extended or adjusted under 35 U.S.C. 154(b) by 0 days.

(21) Appl. No.: 14/005,334

(22) PCT Filed: Mar. 16, 2012

(86) PCT No.: PCT/US2012/029502
§ 371 (c)(1),
(2), (4) Date: Oct. 31, 2013

(87) PCT Pub. No.: WO2012/129111
PCT Pub. Date: Sep. 27, 2012

(65) Prior Publication Data
US 2014/0048488 A1 Feb. 20, 2014

Related U.S. Application Data

(63) Continuation of application No. 13/051,872, filed on Mar. 18, 2011, now abandoned.

(51) Int. Cl.
| B01D 39/00 | (2006.01) |
| B01D 24/00 | (2006.01) |
| B01D 27/02 | (2006.01) |
| A01K 63/04 | (2006.01) |
| C02F 1/28 | (2006.01) |
| C02F 101/32 | (2006.01) |
| C02F 103/00 | (2006.01) |

(52) U.S. Cl.
CPC .................. *C02F 1/288* (2013.01); *C02F 1/285* (2013.01); *C02F 1/286* (2013.01); *C02F 2101/32* (2013.01); *C02F 2101/325* (2013.01); *C02F 2103/008* (2013.01); *C02F 2305/08* (2013.01)

(58) Field of Classification Search
CPC ............ C02F 1/288; C02F 1/42; C02F 1/286; C02F 1/722; B01D 21/0012; B01D 35/18; B01D 29/15; B01D 33/23; B01D 36/003; B01D 35/12; B01D 25/26; B01D 35/02; B01D 39/04; B01D 39/083; B01D 39/18; B01D 21/00; B01D 39/08; A01K 63/045
USPC .......... 210/167.04, 167.31, 167.25, 184, 185, 210/323.1, 331, 338, 340, 346, 433.1, 488, 210/489, 490, 503, 505, 507, 508, 908, 739, 210/767, 791, 799, 96.1, 665, 85, 295, 266, 210/282
See application file for complete search history.

(56) References Cited

U.S. PATENT DOCUMENTS

| 4,851,273 A * | 7/1989 | Brown, Jr. ...................... 210/505 |
| 5,350,527 A * | 9/1994 | Kitko ............................ 210/804 |

(Continued)

*Primary Examiner* — Nam Nguyen
*Assistant Examiner* — Nader Hossain
(74) *Attorney, Agent, or Firm* — The Miller Law Offices PLC; Steven J. Miller, Esq.

(57) ABSTRACT

An apparatus, method, and system for treatment of industrial waste water and/or marine vessel bilge water before discharge into waterways, said waste water having hydrocarbon, and synthetic oils, chemical or surfactant based hydrocarbon emulsions, and water soluble hydrocarbons, containing hydrocarbon coated organics and fine suspended particulate matter, said treatment utilizing a hydrocarbon sorbing prefilter media together with filter structural elements to first remove hydrocarbon contaminated organics and particulate, coalesce then bifurcate and adsorb heavier hydrocarbon elements; the remaining liquid entering the second stage of filtration wherein a cryogenically pulverized recycled tire powder material removes the remaining hydrocarbons, synthetic oils, hydrocarbon emulsions, and water soluble hydrocarbons, providing a highly clarified and oil free effluent at high flow rates and with substantially reduced filter system maintenance. Said invention may further contain a third stage utilizing another layer of hydrocarbon sorbing materials. It may be combined into an oily water separation system.

9 Claims, 2 Drawing Sheets

(56) References Cited

U.S. PATENT DOCUMENTS

| | | | | |
|---|---|---|---|---|
| 5,634,599 A | * | 6/1997 | Khais et al. | 241/23 |
| 5,948,253 A | * | 9/1999 | Hearn | 210/282 |
| 8,277,654 B2 | * | 10/2012 | Levy | 210/282 |
| 2004/0228829 A1 | * | 11/2004 | Roberts et al. | 424/78.1 |
| 2004/0241418 A1 | * | 12/2004 | Cahill | 428/317.9 |
| 2006/0254973 A1 | * | 11/2006 | Olsen et al. | 210/338 |
| 2007/0108056 A1 | * | 5/2007 | Nyberg et al. | 204/554 |
| 2009/0250399 A1 | * | 10/2009 | Pomerleau et al. | 210/693 |

* cited by examiner

FILTRATION OF A HYDROCARBON FROM A FLUID

CROSS REFERENCE TO RELATED APPLICATIONS

This continuation-in-part application claims priority from applicant's U.S. non-provisional application Ser. No. 12/582,684 filed on Oct. 20, 2009, said non-provisional application having claimed priority from applicant's U.S. provisional application No. 61/107,153 filed on Oct. 21, 2008.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of the Invention

This invention relates to an apparatus for, method of, and system for environmentally acceptable treatment of industrial waste water and/or marine vessel bilge waste water before discharge into rivers, lakes, streams and oceans, said waste water comprising hydrocarbons, synthetic oils, chemical or surfactant based hydrocarbon emulsions, and water soluble hydrocarbons, and containing oil coated organics and fine suspended particulate matter, said treatment utilizing a hydrocarbon sorbing pre-filter media (such as polypropylene fibers) together with filter structural elements to first remove hydrocarbon contaminated organics and particulate, coalesce then bifurcate and absorb heavier hydrocarbon elements, then the remaining liquid entering the second stage of filtration wherein a cryogenically pulverized recycled tire powder material removes the remaining hydrocarbons, synthetic oils, hydrocarbon emulsions, and water soluble hydrocarbons providing a highly clarified and oil free effluent at high flow rates and with substantially reduced filter system maintenance. The apparatus, method and system may further contain a third stage comprising another layer of hydrocarbon sorbing materials to sorb any coalesced hydrocarbons that my pass the second stage as it saturates. Further, the aforementioned apparatus, method and system can be combined into a larger oily water separation system comprising electronic oil content monitors and piping to allow the continuous discharge of the separated contaminants to separate storage tanks. The apparatus, method and system of the present invention results in an substantially reduced maintenance means for substantially removing hydrocarbon and organic non-hydrocarbon containing contaminants from industrial waste water and marine vessel bilge water before discharge into rivers, lakes, streams and oceans.

2. Description of Related Art

Industrial facilities such as chemical plants, utility power plants, hospital power plants, corporate and collegiate campus facilities, oil and chemical refineries, and vehicle parking facilities, are coming under increasing scrutiny as sources of hydrocarbon contamination and other chemical and/or pollutant contamination resulting in water having and oil sheen with other small particulate emulsions, such as vehicle and power plant combustion by-products being discharged into streams and ground water. The difficulty is not just handling the hydrocarbons and non-hydrocarbon particulate emulsions, but separating it efficiently and economically from a substantial flow of water. For some time there has been a need to find a way to make a better polishing filter to remove oil and hydrocarbons, both dispersed and emulsified, from flowing water. Current filters on the market are not able to break a chemical/surfactant emulsion, particularly with a single cartridge, they tend to blind or plug quickly, or begin to pass high levels of oil/hydrocarbons after only a small amount of oil is introduced to the cartridges. Turbidity and discoloring of the water from organics and fine suspended particulate matter is also not solved with current filters and said matter causes false positives on electronic pollution monitoring equipment. A new filter design is needed to be able to remove both substantial quantities of hydrocarbons and fine particulate organic and combustion products from a continuous substantial flow of water, such as would be needed to pump out or drain an area from rain and other water intrusion in power plant facilities, parking lots and marine vessel bilges. Thus, it would be desirable to develop a filter apparatus, method and system, such that the apparatus and system does not easily clog or plug, while being injected with a large amount of industrially contaminated waste water comprising both large quantities of various hydrocarbons and non-hydrocarbon containing organic and particulate emulsions. What was needed is an apparatus, method and system to solve the problem of bacteria, vehicle and power plant combustion products, and other organics, combustion product particulates and hydrocarbon contaminants, all together, in the industrial waste water and marine vessel bilge water that cause false positive readings on the new electronic oil content monitors.

Bearing in mind the problems and deficiencies of the prior art, it is therefore an object of the present invention to solve the aforementioned problems in the prior art by providing an apparatus for, method of, and system for treatment of hydrocarbon and non-hydrocarbon containing emulsified contaminated industrial waste water contaminated wherein the contaminated water is rendered substantially hydrocarbon, organics and fine particulate free and clear, for discharge into a river, lake, stream, ground water or ocean.

Other objects and advantages of the invention will in part be obvious and will in part be apparent from the specification.

BRIEF SUMMARY OF THE INVENTION

The above and other objects and advantages, which will be apparent to one of skill in the art, are achieved in the present invention which is directed to, an apparatus for, method of, and system for environmentally acceptable treatment of industrial waste water and/or marine vessel bilge waste water before discharge into rivers, lakes, streams and oceans, said waste water comprising hydrocarbons, synthetic oils, chemical or surfactant based hydrocarbon emulsions, and water soluble hydrocarbons, containing hydrocarbon coated organics and fine suspended particulate matter, said treatment utilizing a hydrocarbon sorbing pre-filter media (such as polypropylene fibers) together with filter structural elements to first remove hydrocarbon contaminated organics and particulate, coalesce then bifurcate and absorb heavier hydrocarbon elements, then the remaining liquid entering the second stage of filtration wherein a cryogenically pulverized recycled tire powder material removes the remaining hydrocarbons, synthetic oils, hydrocarbon emulsions, and water soluble hydrocarbons, providing a highly clarified and oil free effluent at high flow rates and with substantially reduced filter system maintenance. The apparatus, method and system may further contain a third stage comprising another layer of hydrocarbon sorbing materials. Further, the aforementioned apparatus, method and system can be combined into a larger oily water separation system comprising electronic oil content monitors and piping to allow the continuous discharge of the separated contaminants to separate storage tanks. The apparatus, method and system of the present invention results in an substantially reduced maintenance means for substantially removing hydrocarbon and organic non-hydrocarbon containing contaminants from industrial waste water and marine vessel bilge water, without clogging or plugging, before discharge into rivers, lakes, streams and oceans.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

In the drawings.

DETAILED DESCRIPTION OF THE EMBODIMENTS

Figure 1:
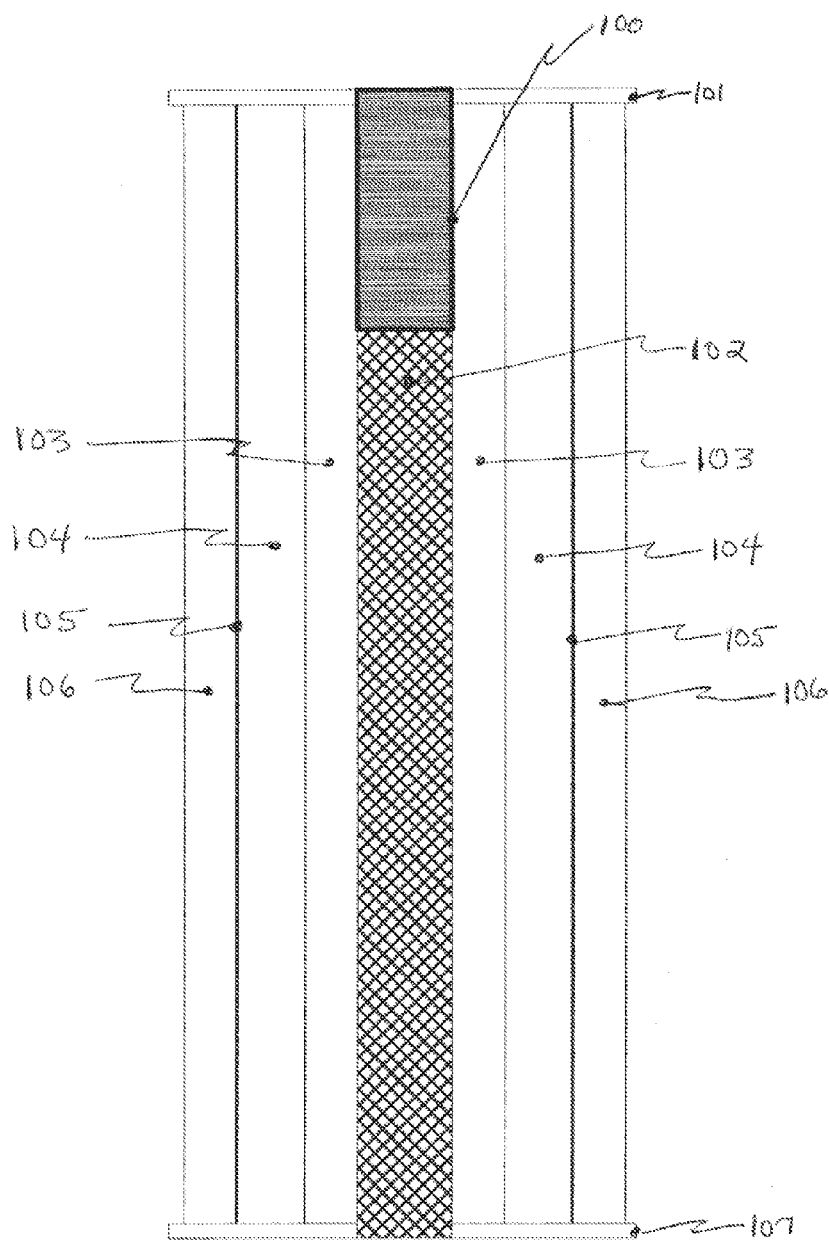
FIG. 1 is a cross-sectional view of an embodiment of the present invention.

Detailed descriptions of the preferred embodiment are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in virtually any appropriately detailed system, structure or manner. For instance, the invention disclosed herein discloses various stages of filtration, said stages may be structurally contained in one enclosure, or more than one enclosure.

In describing the preferred embodiment of the present invention, reference will be made herein to FIG. 1 and FIG. 2 of the drawings in which like numerals refer to like features of the invention. Features of the invention are not necessarily shown to scale in the drawings.

The present invention provides an apparatus for, method of, and system for environmentally acceptable treatment of industrial waste water and/or marine vessel bilge waste water before discharge into rivers, lakes, streams and oceans, said waste water comprising said waste water comprising hydrocarbons, synthetic oils, chemical or surfactant based hydrocarbon emulsions, and water soluble hydrocarbons, containing hydrocarbon coated organics and fine suspended particulate matter, said treatment utilizing a hydrocarbon sorbing pre-filter media (such as polypropylene fibers) together with filter structural elements to first remove hydrocarbon contaminated organics and particulate, coalesce then bifurcate and absorb heavier hydrocarbon elements, then the remaining liquid entering the second stage of filtration wherein a cryogenically pulverized recycled tire powder material removes the remaining hydrocarbons, synthetic oils, hydrocarbon emulsions, and water soluble hydrocarbons, providing a highly clarified and oil free effluent at high flow rates and with substantially reduced filter system maintenance. The apparatus, method and system may further contain a third stage comprising another layer of hydrocarbon sorbing materials. Further, the aforementioned apparatus, method and system can be combined into a larger oily water separation system comprising electronic oil content monitors and piping to allow the continuous discharge of the separated contaminants to separate storage tanks. The apparatus, method and system of the present invention results in an substantially reduced maintenance means for substantially removing hydrocarbon and organic non-hydrocarbon containing contaminants from industrial waste water and marine vessel bilge water, without clogging or plugging, before discharge into rivers, lakes, streams and oceans.

Figure 2:
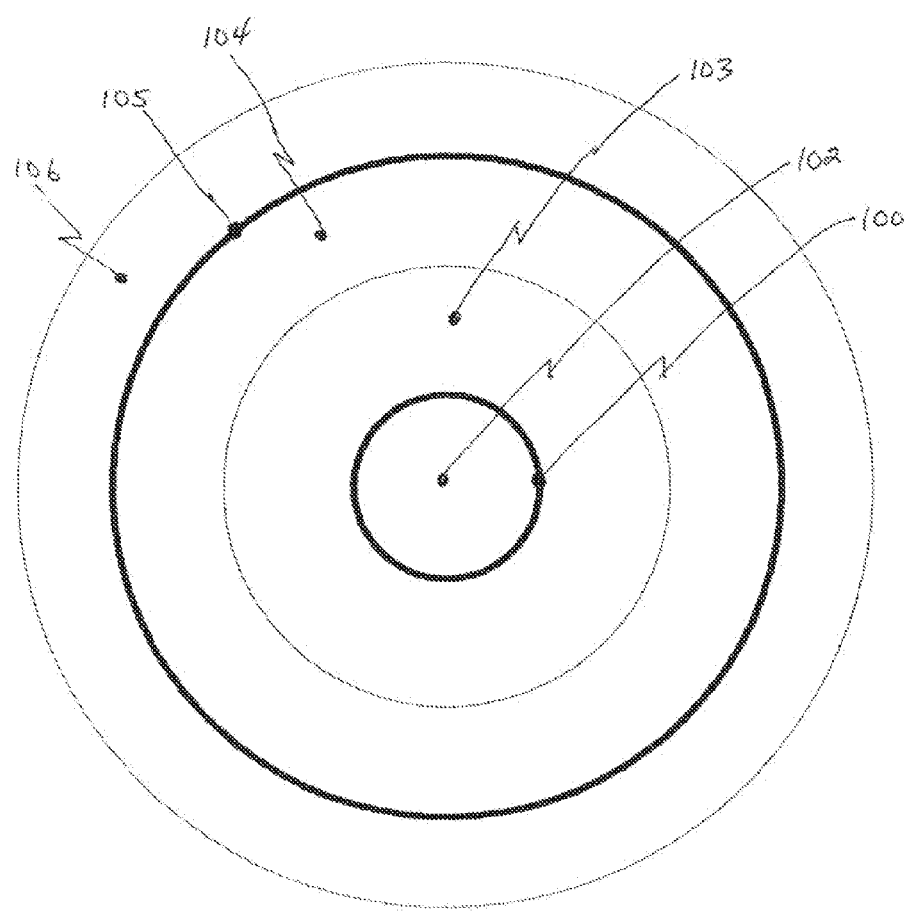
FIG. 2 is a plan view an embodiment of the present invention as shown in FIG. 1.

In FIG. 1 and FIG. 2 is disclosed an embodiment of the present invention which is placed on the discharge of a pumping system or in the drainage flow stream of a gravity fed water drain off system. The pump takes suction from contaminated industrial waste water or contaminated marine vessel bilge water, said waste water having both hydrocarbon and non-hydrocarbon organic and particulate contaminants. The embodiment is shown in a cylindrical cartridge shaped geometry, but the invention is not limited thereby; the invention may also be geometrically configured or shaped as a pillow-like pads wherein the internal absorbing media is enclosed by non-woven fabric. The invention may further be embodied to allow for enhanced radial flow. As shown, said contaminated industrial waste water would enter from the discharge of the aforementioned pumping system on the outside periphery of FIGS. 1 and 2 into an oil sorbent layer (106) which may be 1 to 150 micron polypropylene fiber material. The next adjacent interior material is the cryogenically ground rubber powder filling (104). When the emulsion enters the polypropylene fibers and then the cryogenically ground rubber powder filling at the interface (105), the hydrocarbons separate from the emulsion and are then sorbed. Any remaining hydrocarbons are sorbed and coalesced by the interior layer of hydrocarbon sorbing material thus allowing further sorbing by (103) of any passing hydrocarbons as (104) becomes saturated. Said hydrocarbons are structurally and mechanically trapped from breaking through the top section of the cylindrical filter and entering the clean discharge by the cylindrical baffle (100) located in the top and bottom section of the apparatus together with the top and bottom cover (101) and (107). The hydrocarbon sorbent material (106) and (103) assists in retention of heavy hydrocarbons, organics, and particulate that might clog sorbing layer (104), while also acting as a barrier stopping the hydrocarbon coated organics and particulate from passing through the filter into the clean discharge (102). The top cover plate (101) and bottom cover plate (107) together with the cylindrical baffle (100) act to inhibit mixing of untreated water and treated water, thereby ensuring clean discharge out of the top or bottom of the tube (102). It should be noted that another embodiment of the invention may eliminate the interior second layer of hydrocarbon sorbent material (103) entirely, and yet still function to remove the aforementioned combination of industrial pollutants and contaminants. In the alternate, the aforesaid cryogenically ground rubber powder may further be combined with polypropylene as a copolymer to be melt blown or spunbound as a combined material in microfiber form so that it is embedded throughout the entire apparatus. In addition, carbon and organo clay may be combined or mixed with the aforesaid cryogenically ground rubber powder.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

In so far as the description above and the accompanying drawings disclose any additional subject matter that is not within the scope of the claims below, the inventions are not dedicated to the public and the right to file one or more applications to claim such additional inventions is reserved.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

What is claimed is:

1. An apparatus for the filtering of industrial waste water, said waste water being an emulsion mixture having hydrocarbon organic contaminants including synthetic oils, chemical or surfactant based hydrocarbons, water soluble hydrocarbons, oil coated organics, with fine suspended particulate matter contaminants, said apparatus comprising:
   a cylindrical cartridge shaped enclosure;
   a first and a second filtering stages encased within said enclosure, said first and second filtering stages being structurally geometrically configured as separate concentric cylindrical sections within said cylindrical cartridge shaped enclosure,
   the first filtering stage being located in the outer periphery of said cylindrical cartridge shaped enclosure, the second filtering stage being located concentrically inside of said first filtering stage, said waste water emulsion mixture entering said apparatus on said first filtering stage's outer periphery and then being directed to flow radially inward through said first, and then said second concentric cylindrical sections,
   said first filtering stage having a hydrocarbon sorbing pre-filter media to first remove hydrocarbon organic contaminants and fine suspended particulate matter contaminants then coalesce, bifurcate and adsorb hydrocarbon elements, then said waste water emulsion mixture flowing radially inward entering said second filtering stage,
   said second filtering stage having cryogenically ground rubber powder to further remove said waste water emulsion mixture's hydrocarbon organic contaminants and fine suspended particulate matter contaminants, said apparatus having cylindrical baffles located concentrically inside of said second filtering stage at the top and bottom of the apparatus, said apparatus having top and bottom covers that enclose the top and bottom of said concentrically arranged first and second filtering stages, said apparatus having a clean discharge for the contaminant free waste water to exit said filter,
   said hydrocarbon organic contaminants and fine suspended particulate matter contaminants being structurally and mechanically trapped from breaking through the top sections of the filter's first and second filtering stages and entering said clean discharge by said cylindrical baffle located in the top and bottom section of the apparatus together with said top and bottom covers.

2. The apparatus as in claim 1, further comprising a third filtering stage having a layer of hydrocarbon sorbing material.

3. The apparatus as in claim 1, wherein the hydrocarbon sorbing pre-filter media is 1 to 150 micron polypropylene fiber material.

4. The apparatus of claim 1, wherein the cryogenically ground rubber powder may further be combined with polypropylene as a copolymer to be melt blown or spun bound as a combined material in microfiber form so that it is embedded throughout the entire apparatus.

5. The apparatus of claim 1, wherein carbon and organo clay may be combined or mixed with said cryogenically ground rubber powder.

6. A system for the filtering of industrial waste water by using a filter device, said waste water being an emulsion mixture having hydrocarbon organic contaminants including synthetic oils, chemical or surfactant based hydrocarbons, water soluble hydrocarbons, oil coated organics, with fine suspended particulate matter contaminants, said system comprising:
   having a cylindrical cartridge shaped enclosure;
   having a first and a second filtering stages encased within said enclosure, said first and second filtering stages being structurally geometrically configured as separate concentric cylindrical sections within said cylindrical cartridge shaped enclosure,
   having the first filtering stage being located in the outer periphery of said cylindrical cartridge shaped enclosure, the second filtering stage being located concentrically inside of said first filtering stage,
   having said waste water emulsion mixture entering said filter on said first filtering stage's outer periphery and then being directed to flow radially inward through said first, and then said second concentric cylindrical sections,
   said first filtering stage having a hydrocarbon sorbing pre-filter media to first remove hydrocarbon organic contaminants and fine suspended particulate matter contaminants then coalesce, bifurcate and adsorb hydrocarbon elements,
   then said waste water emulsion mixture flowing radially inward entering said second filtering stage, said second filtering stage having cryogenically ground rubber powder to further remove said waste water emulsion mixture's hydrocarbon organic contaminants and fine suspended particulate matter contaminants, having cylindrical baffles located concentrically inside of said second filtering stage at the top and bottom of the filter, said filter having top and bottom covers that enclose the top and bottom of said concentrically arranged first and second filtering stages,
   having a clean discharge for the contaminant free waste water to exit said filter,
   having said hydrocarbon organic contaminants and fine suspended particulate matter contaminants being structurally and mechanically trapped from breaking through the top sections of the filter's first and second filtering stages and entering said clean discharge by said cylindrical baffle located in the top and bottom section of the filter together with said top and bottom covers.

7. The system as in claim 6, further comprising having a third filtering stage with a layer of hydrocarbon sorbing material.

8. The system as in claim 6, wherein said hydrocarbon sorbing pre-filter media is between 1 to 150 micron polypropylene fiber material.

9. The system of claim 6, wherein the cryogenically ground rubber powder may further be combined with polypropylene as a copolymer to be melt blown or spun bound as a combined material in microfiber form so that it is embedded throughout the entire apparatus.

* * * * *